United States Patent [19]

Hamada et al.

[11] Patent Number: 4,534,815

[45] Date of Patent: Aug. 13, 1985

[54] ADHESIVE PRIMER COMPOSITION AND BONDING METHOD EMPLOYING SAME

[75] Inventors: Mitsuo Hamada; Sadami Yasuda, both of Chiba, Japan

[73] Assignee: Toray Silicone Co., Ltd., Tokyo, Japan

[21] Appl. No.: 671,807

[22] Filed: Nov. 15, 1984

Related U.S. Application Data

[60] Continuation of Ser. No. 497,761, May 24, 1983, abandoned, which is a division of Ser. No. 308,335, Oct. 5, 1981.

[30] Foreign Application Priority Data

Oct. 9, 1980 [JP] Japan ............................. 55-141637

[51] Int. Cl.$^3$ ................................................ C09J 5/02
[52] U.S. Cl. ............................ 156/307.5; 106/287.11; 106/287.13; 106/287.14; 106/287.15; 106/287.16; 156/326; 156/329; 427/407.1; 428/447

[58] Field of Search ..................... 427/407.1; 156/326, 156/307.5, 329; 106/287.11, 287.13, 287.14, 287.16, 287.15; 428/447

[56] References Cited

U.S. PATENT DOCUMENTS

| | | | |
|---|---|---|---|
| 3,022,196 | 2/1962 | Jenkins et al. | 106/287.11 |
| 3,622,440 | 11/1971 | Snedeker et al. | 156/329 |
| 3,671,483 | 6/1972 | Young | 106/287.14 |
| 3,856,606 | 12/1974 | Fan et al. | 156/329 |

*Primary Examiner*—John J. Gallagher
*Attorney, Agent, or Firm*—Roger H. Borrousch

[57] ABSTRACT

A mixture of an organosilicon compound having at least one alkoxy or alkoxyalkoxy radical per molecule, vinyltris(tertiary-butylperoxy)silane, and organic solvent is an adhesive primer composition useful for bonding thermosetting silicone rubber to a substrate, especially for bonding fluorosilicone rubber to a substrate. The adhesive primer composition can be used in a method of bonding thermosetting silicone rubber to a substrate.

2 Claims, No Drawings

ADHESIVE PRIMER COMPOSITION AND BONDING METHOD EMPLOYING SAME

This is a continuation of co-pending application Ser. No. 497,761 filed on May 24, 1983, now abandoned, which in turn is a division of Ser. No. 308,335, filed 10/9/81.

BACKGROUND OF THE INVENTION

1. Field of the Invention

This invention relates to an excellent adhesive primer composition. More specifically, this invention relates to a primer composition which is appropriate for attaching thermosetting-type silicone rubber, especially fluorosilicone rubber, to various materials, such as metal surfaces. This invention also relates to a method of bonding a thermosetting silicone rubber to a substrate.

2. Description of the Prior Art

It is a known fact that vinyltris(tertiary-butylperoxy)silane is traditionally used as a primer for attaching EPDM, EPR, chlorinated polyethylene or silicone rubber or glass or metal surfaces. However, this primer exhibits drawbacks such as the necessity of long-term heat treatment at an elevated temperature and pressure. For this reason, Maizumi and Inoue in Japanese Patent No. Sho 50[1975]-35,530, published Nov. 17, 1975, describes an adhesive primer composition which can be used as a primer for attaching thermoplastic resins to each other or attaching thermoplastic resin to glass, metals or metal oxides at low temperatures in a short period of time. The primer composition of Maizumi and Inoue is composed of vinyltris(tertiary-butylperoxy)silane, an organoperoxide whose half-life is 1 minute at 130°-190° C., and an inert organic solvent. However, this primer composition of Maizumi and Inoue exhibits slow air-drying and slow thermosetting properties after it has been coated over with a material to be attached. Therefore, the primer layer coated on the material surface moves from one location to another location by press insertion of material during injection- or press-molding processes. For this reason, this primer composition of Maizumi and Inoue exhibits not only drawbacks such as difficulty in achieving uniform adhesion, but also the drawback of interfacial delamination which can be detected by inspection of the adhesion properties of silicone rubber, especially fluorosilicone rubber as a material to be attached. For this reason, this primer composition of Maizumi and Inoue is unsatisfactory for attaching silicone rubber to a substrate, especially for attaching fluorosilicone rubber to a substrate.

SUMMARY OF THE INVENTION

The present inventors examined various primer compositions and finally developed primer compositions effective for attaching silicone rubber to a substrate, especially for attaching fluorosilicone rubber to a substrate.

This invention relates to an adhesive primer composition consisting essentially of (A) 100 parts by weight of an organosilicon compound of the average unit formula $$R_a(XR^1)_b(OR^2)_cSiO_{\frac{4-a-b-c}{2}}$$

in which R represents a monovalent hydrocarbon radical or a halogenated monovalent hydrocarbon radical, X represents a monovalent radical selected from the group consisting of epoxy, acryloxy, methacryloxy, amino, N-alkylamino, N-phenylamino, N-aminoalkylamino, cyano, and mercapto, $R^1$ represents a bivalent radical selected from the group consisting of hydrocarbon radicals, halogenated hydrocarbon radicals, hydroxyhydrocarbon radicals, and ether radicals, $R^2$ represents an alkyl radical or an alkoxyalkyl radical, a has a value such that $0 \leq a \leq 3$, b has a value such that $0 \leq b \leq 3$, c has a value such that $0 \leq c \leq 4$, the sum of a+b+c has a value such that $0 \leq (a+b+c) \leq 4$, and there is at least one $-OR^2$ per molecule of organosilicon compound, (B) 3 to 60 parts by weight of vinyltris(tertiary-butylperoxy)silane, and (C) at least 4.5 parts by weight of an organic solvent.

DESCRIPTION OF THE INVENTION

The organosilicon compound which is used as component (A) of this invention can be a silane or polysiloxane containing at least one $-OR^2$ per molecule and can be expressed by the average unit formula $$R_a(XR^1)_b(OR^2)_cSiO_{\frac{4-a-b-c}{2}}$$

and includes tetraalkoxysilanes, organoalkoxysilanes containing at least one $-OR^2$ per molecule, alkyl polysilicate, and organoalkoxypolysiloxanes containing at least one $-OR^2$ per molecule.

In the formula, R can be a monovalent hydrocarbon radical, such as an alkyl radical such as methyl, ethyl, or propyl, an alkenyl radical such as vinyl or allyl, an aryl radical such as phenyl, or a halogenated monovalent hydrocarbon radical such as halogenated derivatives of the monovalent hydrocarbon radicals, for example 3,3,3-trifluoropropyl. X is a monovalent radical selected from acryloxy radical, N-phenylamino radical, N-aminoalkylamino radical, epoxy radical, methacryloxy radical, amino radical, cyano radical, N-alkylamino radical, or mercapto radical. X is bonded to $R^1$, a bivalent radical such as bivalent hydrocarbon radical, such as a methylene, ethylene, propylene, phenylene; bivalent hydroxyhydrocarbon radicals; halogenated bivalent hydrocarbon radicals such as chloroethylene, fluoroethylene; and bivalent ether radicals such as
—CH₂O CH₂ CH₂ CH₂—,
—CH₂ CH₂O CH₂ CH₂—, $$\overset{CH_3}{\underset{|}{-CH_2CH_2OCHCH_2-,}}$$

and
—CH₂O CH₂ CH₂O CH₂ CH₂—.

$R^2$ is an alkyl radical such as methyl, ethyl, propyl, butyl, pentyl, octyl, or decyl; or an alkoxyalkyl radical such as methoxyethyl(methylcellosolve). Preferably, R is vinyl, allyl, methyl, ethyl, propyl, phenyl, or 3,3,3-trifluoropropyl; X is H₂NCH₂CH₂NH—, H₂N(CH₂CH₂NH)₂—, N-phenylamino, acryloxy, cyano, epoxy, methacryloxy, or mercapto; $R^1$ is propylene or —CH₂O(CH₂)₃—, and $R^2$ is alkyl of 1 to 4 carbon atoms or alkoxyalkyl of 2 to 4 carbon atoms. Preferably, a has a value from 0 to 1 inclusive, b has a value from 0 to 1 inclusive, c has a value from 2 to 4 inclusive with most preferred values from 3 to 4 inclusive, and the sum of a+b+c has a value from 2 to 4 inclusive.

Organoalkoxypolysiloxanes of (A) can be the partially hydrolyzed products of the organoalkoxysilanes. The organoalkoxypolysiloxanes have at least one —$OR^2$ per molecule, can be linear, cyclic, or branched structure which may or may not form network structures, and can be homopolymers or copolymers.

The most desirable organosilicon compounds of component (A) have at least three —$OR^2$ per molecule. The best organosilicon compounds of (A) are n-propylorthosilicate, ethylpolysilicate, methylcellosolve orthosilicate, vinyltrimethoxysilane, vinyltriethoxysilane, gamma-methacryloxypropyltrimethoxysilane, and gamma-methacryloxypropyltriethoxysilane.

One or more types of organosilicon compound can be blended and used as component (A). Component (A) improves the air-drying properties of the adhesive primer composition in the presence of component (B) and also increases the adhesive strength of the primer film to a substrate.

Component (B) used by the method of this invention is indispensable to further improve the adhesive strength of component (A). The vinyltris(tertiary-butylperoxy)silane is available commercially. The quantity of component (B) to be used is 3 to 60 parts by weight, preferably 5 to 50 parts by weight, per 100 parts by weight of component (A). When this quantity is less than the above-mentioned value, the primer composition does not exhibit good adhesive strength. On the other hand, when this quantity exceeds the above-mentioned value, the air-drying properties and adhesive strength decline.

Component (C) used in this invention is an organic solvent which dissolves components (A) and (B) and is selected from the standpoints of the desired solubility and evaporative properties of the primer at the time of application. Examples of this component are toluene, xylene, benzene, heptane, hexane, rubber solvent (naptha), trichloroethane, perchloroethylene, or a mixture of two or more types of these solvents. The amount of (C) should be determined by considering the viscosity appropriate for the application of the primer. The amount of (C) is at least 4.5 parts by weight based on 100 parts by weight of (A), preferably 100 to 3000 parts by weight.

The primer composition can be easily produced simply by blending the components (A), (B), and (C). Various inorganic fillers such as fumed silica, precipitated silica, fine quartz powder, diatomaceous earth, calcium carbonate, red oxide, cerium oxide, titanium oxide, alumina or carbon black can be added. In addition, known heat-resisting agents, coloring agents, and other additives such as organotitanium esters can be added. Moreover, one or two or more types of organosilanes or organopolysiloxanes besides component (A) can be also included.

The adhesive primer composition of this invention is useful for bonding thermosetting silicone rubber to a substrate. The substrate is coated with the adhesive primer composition. The substrate need not be completely coated, only the surface to which silicone rubber is to be adhered need be coated. After the substrate is coated, the primer is allowed to air-dry at room temperature for at least 30 minutes. A silicone rubber composition of the thermosetting type (heat vulcanizable) is then coated over the dried primer coating, the resulting assembly is then heated to cure the silicone rubber composition, thus making an assembly where silicone rubber is bonded to a substrate through a primer.

Examples of the substrates are metals such as iron, aluminum, copper, zinc, stainless steel, brass, or bronze; plastics such as epoxy resin, vinyl chloride resin, polyester resin, or polyamide resin, and inorganic materials such as glass, mortar, or asbestos.

The silicone rubber is a thermosetting-type silicone rubber in which the principal components are organoperoxides, fillers, polymers, copolymers, or a mixture of polymers and copolymers whose monomer units include dimethylsiloxane, methylphenylsiloxane, diphenylsiloxane, methylvinylsiloxane, phenylvinylsiloxane, 3,3,3-trifluoropropylmethylsiloxane, 3,3,3-trifluoropropylvinylsiloxane, or 3,3,3-trifluoropropylphenylsiloxane. The adhesive primer composition of this invention is advantageously used for adhesion of fluorosilicone rubber, which possesses fluorinated hydrocarbon groups such as 3,3,3-trifluoropropyl groups and which cannot be easily attached to substrates by using a traditional primer.

The adhesive primer composition of this invention is especially useful as a primer and also can be used for the adhesion of silicone rubbers to each other and adhesion of natural or synthetic rubber to silicone rubber.

This invention will be explained using demonstrative examples. "Parts" in the examples means "parts by weight", and the viscosity is the value measured at 25° C.

EXAMPLE 1

Various primer compositions are listed in Table I with their components and quantities. The components listed in Table I were mixed with 1,000 parts of rubber solvent, which is a naptha having a boiling point range of 43° C. to 140° C. The compositions were coated in a thin layer on metal plates of iron, phosphor bronze, and stainless steel, and then air-dried at room temperature for 60 minutes. A fluorosilicone rubber composition (Silastic ® LS 63U fluorosilicone rubber, Dow Corning Corporation, Midland, Mich., USA) was mixed with 0.5 percent by weight of 2,5-dimethyl-2,5-di(tertiarybutylperoxy)hexane, and then the resulting composition was coated on the coated, air-dried, metal substrate surfaces to provide a thickness of four millimeters. The resulting composite was heated at 170° C. and an elevated pressure of 2.94 MPa (megapascals) for 10 minutes to cure the fluorosilicone rubber composition and attach the resulting fluorosilicone rubber to the metal plate. The adhesion properties were determined by pulling the fluorosilicone rubber from the metal plate. The primer coated on the metal plate was examined with a finger after it had been air-dried for 60 minutes, and the dry state was labeled as "O" and the sticky state was labeled as "X". The results are reported in Table I. In Table I, cohesive failure means that the rubber ruptures leaving a thick layer of rubber attached to the substrate. Thin layer cohesive failure means that a thin layer about 0.1 to 0.2 mm thick of rubber remains on the substrate surface after pulling. The adhesion value of thin layer cohesive failure is far smaller than cohesive failure.

TABLE I

|  | Component | This Invention 1 | This Invention 2 | Comparison Example 1 | Comparison Example 2 | Comparison Example 3 |
|---|---|---|---|---|---|---|
| (A) | Ethyl polysilicate (parts) | 50 | — | — | — | — |
|  | Methyl Cellosolve ortho-silicate (parts) | 50 | 100 | — | — | — |
| (B) | Vinyltris(tertiary-butyl-peroxy)silane (parts) | 20 | 30 | 100 | 100 | 130 |
|  | Di-tertiary-butyl peroxide (parts) | — | — | — | 50 | — |
| Adhesion Properties: |  |  |  |  |  |  |
| Iron Phosphor bronze Stainless steel |  | In every case, 100% cohesion failure | In every case, 100% cohesion failure | In every case, thin layer cohesion failure | In every case, 100% interfacial delamination | In every case, 100% interfacial delamination |
| Air-drying properties |  | O | O | X | X | X |

EXAMPLE 2

Various primer compositions of 1,000 parts of rubber solvent whose other components and their quantities are given in Table II were prepared, and were coated on metal plates identical to those used in Example 1 and air-dried at room temperature for 60 minutes. On the coated and dried surface, 4 mm-thick polydimethylsiloxane rubber composition (brand name SH-52 U from Toray Silicone Co., Tokyo, Japan) to which had 0.7% by weight of 2,4-dichlorobenzoyl peroxide added to it was heated at 120° C. and an elevated pressure of 2.94 MPa for 5 minutes to attach the polydimethylsiloxane rubber to the metal plate. The adhesion and air-drying properties of the primer were examined by methods identical to those of Example 1. The results are reported in Table II.

TABLE II

|  | Component | This Invention 4 | This Invention 5 | Comparison Example 3 | Comparison Example 4 | Comparison Example 6 |
|---|---|---|---|---|---|---|
| (A) | n-Propyl ortho-silicate (parts) | 100 | — | — | — | — |
|  | Vinyltrimethoxy-silane (parts) | — | 100 | — | — | — |
| (B) | Vinyltris-(tertiary-butylperoxy)silane (parts) | 15 | 20 | 100 | 100 | 115 |
|  | Di-tertiary-butyl peroxide (parts) | — | — | — | 100 | — |
| Adhesion Properties: |  |  |  |  |  |  |
| Iron Phosphor bronze Stainless steel |  | In every case, 100% cohesion failure | In every case, 100% cohesion failure | In every case, thin layer cohesion failure | In every case, interfacial delamination | In every case, thin layer cohesion failure |
| Air-drying properties of primer |  | O | O | X | X | X |

EXAMPLE 3

The adhesion and air-drying properties of primer composition, which contained organotrialkoxysilane shown in Table III, were examined by methods identical to those of Example 1 using unvulcanized fluorosilicone rubber and metal plates both of which were identical to those used in Example 1. The organic solvent used was 1,000 parts of toluene in each case. As demonstrated in Table III, the results showed that the primer composition of this invention exhibited excellent adhesive properties.

TABLE III

|  | Component | This Invention 5 | This Invention 6 | This Invention 7 | This Invention 8 | Comparison Example 7 | Comparison Example 8 | Comparison Example 9 | Comparison Example 10 |
|---|---|---|---|---|---|---|---|---|---|
| (A) | H$_2$NCH$_2$CH$_2$NH(CH$_2$)$_3$Si(OCH$_3$)$_3$ (parts) | 100 | — | — | — | 115 | — | — | — |
|  | H$_2$C—CHCH$_2$O(CH$_2$)$_3$Si(OCH$_3$)$_3$ with O bridge (parts) | — | 100 | — | — | — | 120 | — | — |

TABLE III-continued

|  | Component | This Invention 5 | 6 | 7 | 8 | Comparison Example 7 | 8 | 9 | 10 |
|---|---|---|---|---|---|---|---|---|---|
|  | $H_2C=C-CO(CH_2)_3Si(OCH_3)_3$<br>  $\quad\ \ |\quad\ \ \|$<br>  $\quad\ CH_3\ O$<br>(parts) | — | — | 100 | — | — | — | 125 | — |
|  | $HSCH_2CH_2CH_2Si(OCH_3)_3$ (parts) | — | — | — | 100 | — | — | — | 120 |
| (B) | Vinyltris(tertiary-butylperoxy)silane (parts) | 15 | 20 | 25 | 20 | — | — | — | — |
| Adhesion Properties |  |  |  |  |  |  |  |  |  |
| Iron<br>Phosphor bronze<br>Stainless steel |  | * | * | * | * | ** | ** | ** | ** |
| Air-drying properties of primer |  | O | O | O | O | X | X | X | X |

*In every case, 100% cohesion failure
**In every case, 100% interfacial delamination

EXAMPLE 4

The adhesion and air-drying properties of the primer compositions given in Table IV were examined by methods identical to those of Example 1. The compositions contained 30 parts of toluene. As demonstrated in Table IV, each primer composition exhibited excellent adhesive properties.

TABLE IV

|  | Component | This Invention 9 | 10 | Comparison Example 11 | 12 |
|---|---|---|---|---|---|
| (A) | $\begin{array}{ccc}CH_3 & CH_3 & CH_3\\ \mid & \mid & \mid\\ C_2H_5O-SiO-Si-OSi-OC_2H_5\text{(parts)}\\ \mid & \mid & \mid\\ OC_2H_5 & OC_2H_5 & OC_2H_5\end{array}$ | 100 | — | 120 | — |
|  | liquid organopolysiloxane resin Note 1 (parts) | — | 100 | — | 120 |
| (B) | Vinyltris(tertiary-butylperoxy)silane (parts) | 20 | 20 | — | — |
| Adhesion Properties |  |  |  |  |  |
| Iron<br>Phosphor bronze<br>Stainless steel |  | In every case, 100% cohesion failure | In every case, 100% cohesion failure | In every case, 100% interfacial delamination | In every case, 100% interfacial delamination |
| Air-drying properties of primer |  | O | O | X | X |

Note 1.
Liquid organopolysiloxane resin having a viscosity of 0.002 m²/s; alkoxy group content of 10% by weight and produced by hydrolysis of $CH_3Si(OCH_3)_3$ (60 mol %), $(CH_3)CH_2=CHSi(OC_2H_5)_2$ (30 mol %) and $(C_6H_5)_2Si(OCH_3)_2$ (10 mol %).

That which is claimed is:
1. A method of bonding thermosetting silicone rubber to a substrate consisting of
   (1) coating the substrate with an adhesive primer composition consisting essentially of
   (A) 100 parts by weight of an organosilicon compound of the average unit formula

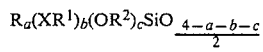

in which R represents a monovalent hydrocarbon radical or a halogenated monovalent hydrocarbon radical, X represents a monovalent radical selected from the group consisting of epoxy, acryloxy, methacryloxy, amino, N-alkylamino, N-phenylamino, N-aminoalkylamino, cyano, and mercapto, $R^1$ represents a bivalent radical selected from the group consisting of hydrocarbon radicals, halogenated hydrocarbon radicals, hydroxyhydrocarbon radicals, and ether radicals, $R^2$ represents an alkyl radical or an alkoxyalkyl radical, a has a value such that $0 \leq a \leq 3$, b has a value such that $0 \leq b \leq 3$, c has a value such that $0 < c \leq 4$, and the sum of $a+b+c$ has a value such that $0 < (a+b+c) \leq 4$, and there is at least one $-OR^2$ per molecule of organosilicon compound,
   (B) 3 to 60 parts by weight of vinyltris(tertiary-butylperoxy)silane, and
   (C) at least 4.5 parts by weight of an organic solvent,
   (2) air drying the coated substrate obtained from step (1) for at least 30 minutes at room temperature,
   (3) applying over the dried primer coating obtained from step (2), a silicone rubber composition which is heat vulcanizable,
   (4) heating the assembly obtained from step (3) to cure the silicone rubber composition.
2. The method according to claim 1 in which the silicone rubber is fluorosilicone rubber.

* * * * *

UNITED STATES PATENT AND TRADEMARK OFFICE
CERTIFICATE OF CORRECTION

PATENT NO. : 4,534,815

DATED : October 13, 1985

INVENTOR(S) : Mitsuo Hamada and Sadami Yasuda

It is certified that error appears in the above-identified patent and that said Letters Patent is hereby corrected as shown below:

In Column 6, Table II, the heading numbers "4", "5", "3", "4" should read "3", "4", "4", "5"

Signed and Sealed this

Fourth Day of March 1986

[SEAL]

Attest:

Attesting Officer

DONALD J. QUIGG

Commissioner of Patents and Trademarks